United States Patent
Gano et al.

(10) Patent No.: US 10,871,052 B2
(45) Date of Patent: Dec. 22, 2020

(54) DEGRADABLE PLUG FOR A DOWNHOLE TUBULAR

(71) Applicant: Halliburton Energy Services, Inc., Houston, TX (US)

(72) Inventors: John Charles Gano, Lowery Crossing, TX (US); Pete Dagenais, The Colony, TX (US); Michael Linley Fripp, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 14 days.

(21) Appl. No.: 16/321,883

(22) PCT Filed: Sep. 15, 2016

(86) PCT No.: PCT/US2016/051857
§ 371 (c)(1),
(2) Date: Jan. 30, 2019

(87) PCT Pub. No.: WO2018/052421
PCT Pub. Date: Mar. 22, 2018

(65) Prior Publication Data
US 2019/0203563 A1    Jul. 4, 2019

(51) Int. Cl.
*E21B 43/08* (2006.01)
*E21B 33/12* (2006.01)
(Continued)

(52) U.S. Cl.
CPC .......... *E21B 34/063* (2013.01); *E21B 33/12* (2013.01); *E21B 43/08* (2013.01);
(Continued)

(58) Field of Classification Search
CPC ....................................................... E21B 43/08
See application file for complete search history.

(56) References Cited

U.S. PATENT DOCUMENTS

| 6,224,112 | B1 | 5/2001 | Eriksen et al. |
| 7,699,101 | B2 | 4/2010 | Fripp |
(Continued)

FOREIGN PATENT DOCUMENTS

| WO | WO 1999/058814 A1 | 11/1999 |
| WO | WO 2015/127047 A1 | 8/2015 |
(Continued)

OTHER PUBLICATIONS

International Search Report and the Written Opinion, dated May 25, 2017, PCT/US2016/051857, 14 pages, ISA/KR.

*Primary Examiner* — Giovanna Wright
(74) *Attorney, Agent, or Firm* — Haynes and Boone, LLP (57) ABSTRACT

An apparatus and related method of assembling a degradable plug adapted to selectively permit fluid communication through a flow path of a downhole tubular. In an exemplary embodiment, the method includes providing a housing defining an internal flow passage and one or more internal annular grooves adjoining the internal flow passage; positioning a generally cylindrical core within the internal flow passage; applying a first axially compressive force against the core so that respective exterior portions of the core expand or flow into the one or more internal annular grooves of the housing and the housing elastically deforms in a radially outward direction; and removing the first axially compressive force from the core so that the housing recoils in a radially inward direction, which is opposite the radially outward direction, thus placing a first stress on the core.

19 Claims, 6 Drawing Sheets

(51) Int. Cl.
    *E21B 34/06*     (2006.01)
    *F16L 55/11*     (2006.01)

(52) U.S. Cl.
    CPC ......... *F16L 55/1108* (2013.01); *E21B 43/084* (2013.01); *E21B 43/088* (2013.01)

(56) References Cited

U.S. PATENT DOCUMENTS

| | | |
|---|---|---|
| 8,413,727 B2 | 4/2013 | Holmes |
| 8,573,295 B2 | 11/2013 | Johnson et al. |
| 8,863,850 B2 | 10/2014 | Sherman et al. |
| 2011/0056688 A1 | 3/2011 | Johnson |
| 2013/0327540 A1 | 12/2013 | Hamid et al. |
| 2015/0240584 A1* | 8/2015 | Desai ................ E21B 33/1208 166/192 |
| 2015/0240587 A1* | 8/2015 | Peterson ............... E21B 34/063 166/296 |

FOREIGN PATENT DOCUMENTS

| | | |
|---|---|---|
| WO | WO 2015/134074 A1 | 9/2015 |
| WO | WO 2016/108892 A1 | 7/2016 |
| WO | WO 2018/052421 A1 | 3/2018 |

* cited by examiner

DEGRADABLE PLUG FOR A DOWNHOLE TUBULAR

PRIORITY

The present application is a U.S. National Stage patent application of International Patent Application No. PCT/US2016/051857, filed on Sep. 15, 2016, the benefit of which is claimed and the disclosure of which is incorporated herein by reference in its entirety.

TECHNICAL FIELD

The present disclosure relates generally to oil and gas operations and the equipment used therefor, and, more specifically, to a degradable plug for a downhole tubular.

BACKGROUND

In the process of completing an oil or gas well, a tubular is run downhole and may be used to communicate injection or treatment fluids from the surface into the formation, or to communicate produced hydrocarbons from the formation to the surface. This tubular may be coupled to a filter assembly. The filter assembly includes a screen having multiple entry points at which the injection, treatment, or production fluid passes through the filter assembly. The screen is generally cylindrical and is wrapped around a base pipe having openings formed therein. It is often advantageous to impede fluid communication through the openings in the base pipe during installation of the filter assembly in the wellbore. However, once the filter assembly is properly positioned in the wellbore, fluid communication must be established through the openings in the base pipe at an appropriate time, and in a suitable manner, for the particular operation performed. Therefore, what is needed is a system, assembly, method, or apparatus that addresses one or more of these issues, and/or other issues.

BRIEF DESCRIPTION OF THE DRAWINGS

Various embodiments of the present disclosure will be understood more fully from the detailed description given below and from the accompanying drawings of various embodiments of the disclosure. In the drawings, like reference numerals may indicate identical or functionally similar elements.

DETAILED DESCRIPTION

Illustrative embodiments and related methods of the present disclosure are described below as they might be employed in a degradable plug for a downhole tubular. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

The following disclosure may repeat reference numerals and/or letters in the various examples or figures. This repetition is for the purpose of simplicity and clarity and does not in itself dictate a relationship between the various embodiments and/or configurations discussed. Further, it should be understood that the use of spatially relative terms such as "above," "below," "upper," "lower," "upward," "downward," "uphole," "downhole," and the like are used in relation to the illustrative embodiments as they are depicted in the figures, the upward and downward directions being toward the top and bottom of the corresponding figure, respectively, and the uphole and downhole directions being toward the surface and toe of the well, respectively. Unless otherwise stated, the spatially relative terms are intended to encompass different orientations of the apparatus in use or operation in addition to the orientation depicted in the figures. For example, if an apparatus in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Although a figure may depict a horizontal wellbore or a vertical wellbore, unless indicated otherwise, it should be understood that the apparatus according to the present disclosure is equally well suited for use in wellbores having other orientations including vertical wellbores, horizontal wellbores, slanted wellbores, multilateral wellbores, or the like. Further, unless otherwise noted, even though a figure may depict an offshore operation, it should be understood that the apparatus according to the present disclosure is equally well suited for use in onshore operations. Finally, unless otherwise noted, even though a figure may depict a cased-hole wellbore, it should be understood that the apparatus according to the present disclosure is equally well suited for use in open-hole wellbore operations.

Figure 1:
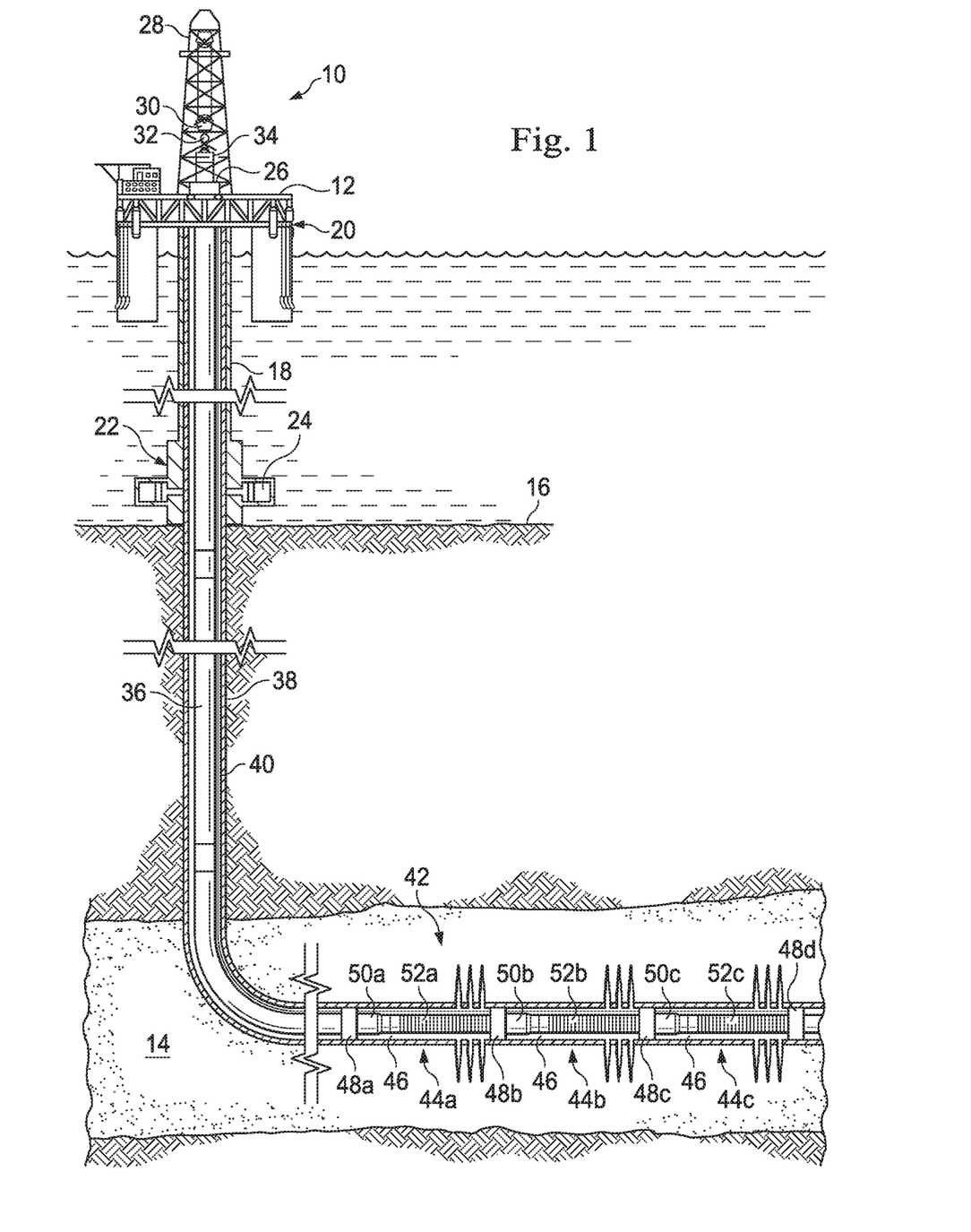
FIG. 1 is a schematic illustration of an offshore oil and gas platform operably coupled to a completion string disposed within a wellbore, the completion string including a filter assembly, according to an exemplary embodiment.

Referring to FIG. 1, an offshore oil and gas platform is schematically illustrated and generally designated by the reference numeral 10. In an exemplary embodiment, the offshore oil and gas platform 10 includes a semi-submersible platform 12 that is positioned over a submerged oil and gas formation 14 located below a sea floor 16. A subsea conduit 18 extends from a deck 20 of the platform 12 to a subsea wellhead installation 22. One or more pressure control devices 24, such as, for example, blowout preventers (BOPs), and/or other equipment associated with drilling or producing a wellbore may be provided at the subsea wellhead installation 22 or elsewhere in the system. The platform 12 may include a hoisting apparatus 26, a derrick 28, a travel block 30, a hook 32, and a swivel 34, which components are together operable for raising and lowering a conveyance vehicle 36.

A variety of conveyance vehicles 36 may be raised and lowered from the platform 12, such as, for example, casing, drill pipe, coiled tubing, production tubing, other types of pipe or tubing strings, and/or other types of conveyance vehicles, such as wireline, slickline, and the like. In the embodiment of FIG. 1, the conveyance vehicle 36 is a substantially tubular, axially extending tubular string made up of a plurality of pipe joints coupled to one another end-to-end. The platform 12 may also include a kelly, a rotary table, a top drive unit, and/or other equipment associated with the rotation and/or translation of the conveyance vehicle 36. A wellbore 38 extends from the subsea wellhead installation 22 and through the various earth strata, including the formation 14. At least a portion of the wellbore 38 may include a casing string 40 cemented therein. Connected to the conveyance vehicle 36 and extending within the wellbore 38 is a generally tubular lower completion string 42 in which the degradable plug for a downhole tubular of the present disclosure is incorporated.

In an exemplary embodiment, the lower completion string 42 is disposed in a substantially horizontal portion of the wellbore 38 and includes one or more completion sections 44 such as, for example, completion sections 44a-c corresponding to different zones of the formation 14. An annulus 46 is defined between the lower completion string 42 and the casing string 40. The lower completion string 42 includes isolation packers 48a-d, packing valves 50a-c, and filter assemblies 52a-c. Each of the isolation packers 48a-c, respectively, the packing valves 50a-c, respectively, and the filter assemblies 52a-c, respectively, corresponds to a respective completion section 44a-c of the completion string 42.

The isolation packers 48a-d each form an annular seal between the casing string 40 and the lower completion string 42, thereby fluidically isolating the completion sections 44a-c from each another within the annulus 46. In an exemplary embodiment, one or more of the isolation packers 48a-d is a hydraulic set packer. In several exemplary embodiments, one or more of the isolation packers 48a-d is another type of packer that is not a hydraulic set packer, such as, for example, a mechanical set packer, a tension set packer, a rotation set packer, an inflatable packer, another type of packer capable of sealing the annulus 46, or any combination thereof.

The packing valves 50a-c facilitate the fracturing or gravel-packing of each zone of the formation 14. Specifically, the packing valves 50a-c are adapted to direct the flow of a fluid into the annulus 46. In several exemplary embodiments, the fluid may include any fluid used to enhance production and/or injection of the formation 14, such as, for example, a gravel slurry, a proppant slurry, a slurry including another granular media, hydrocarbons, a fracturing fluid, an acid, other fluids introduced or occurring naturally within the wellbore 38 or the formation 14, or any combination thereof.

The filter assemblies 52a-c control and limit debris such as gravel, sand, and other particulate matter from entering the lower completion string 42 and, thereafter, the conveyance vehicle 36. Several intervals of the casing string 40 are perforated adjacent the filter assemblies 50a-c. The structure and operation of the filter assemblies 52a-c will be discussed in further detail below.

As indicated above, each completion section 44a-c includes respective ones of the isolation packers 48a-c, the packing valves 50a-c, and the filter assemblies 52a-c. The completion sections 44a-c are identical to one another and, therefore, only one of the completion sections 44a-c will be described in detail below using the foregoing reference numerals; however, the suffixes a-c will be omitted to indicate that the description below applies to any one of the completion sections 44a-c. Thus, each completion section 44 of the lower completion string 42 includes the isolation packer 48, the packing valve 50, and the filter assembly 52.

Generally, with continuing reference to FIG. 1, the operation of the lower completion string 42 includes communicating a fluid within a work string (not shown) from the surface to the completion section 44 to perform injection or well treatment operations, such as, for example, fracturing or gravel-packing of the formation 14. Alternatively, the operation of the lower completion string 42 includes producing hydrocarbons and/or other natural resources from the formation 14 via the wellbore 38 and the casing string 40. During such fracturing and/or gravel-packing operations, the packing valve 50 directs fluid into the annulus 46. In the case of a fracturing operation, the fluid transports a particulate material (i.e., proppant) into the formation 14, thereby propping open induced fractures in the formation 14. Alternatively, in the case of a gravel-packing operation, the fluid transports a particulate material (i.e., gravel) to the annulus 46 to form a gravel-pack filter around the filter assembly 52. The gravel-pack filter is a permeable mass that prevents, or at least reduces, the flow of debris from the formation 14 into the filter assembly 52. During production operations, the filter assembly 52 and the gravel-pack filter control and limit debris such as gravel, sand, or other particulates from entering the lower completion string 42 and being communicated to the surface.

Figure 2:
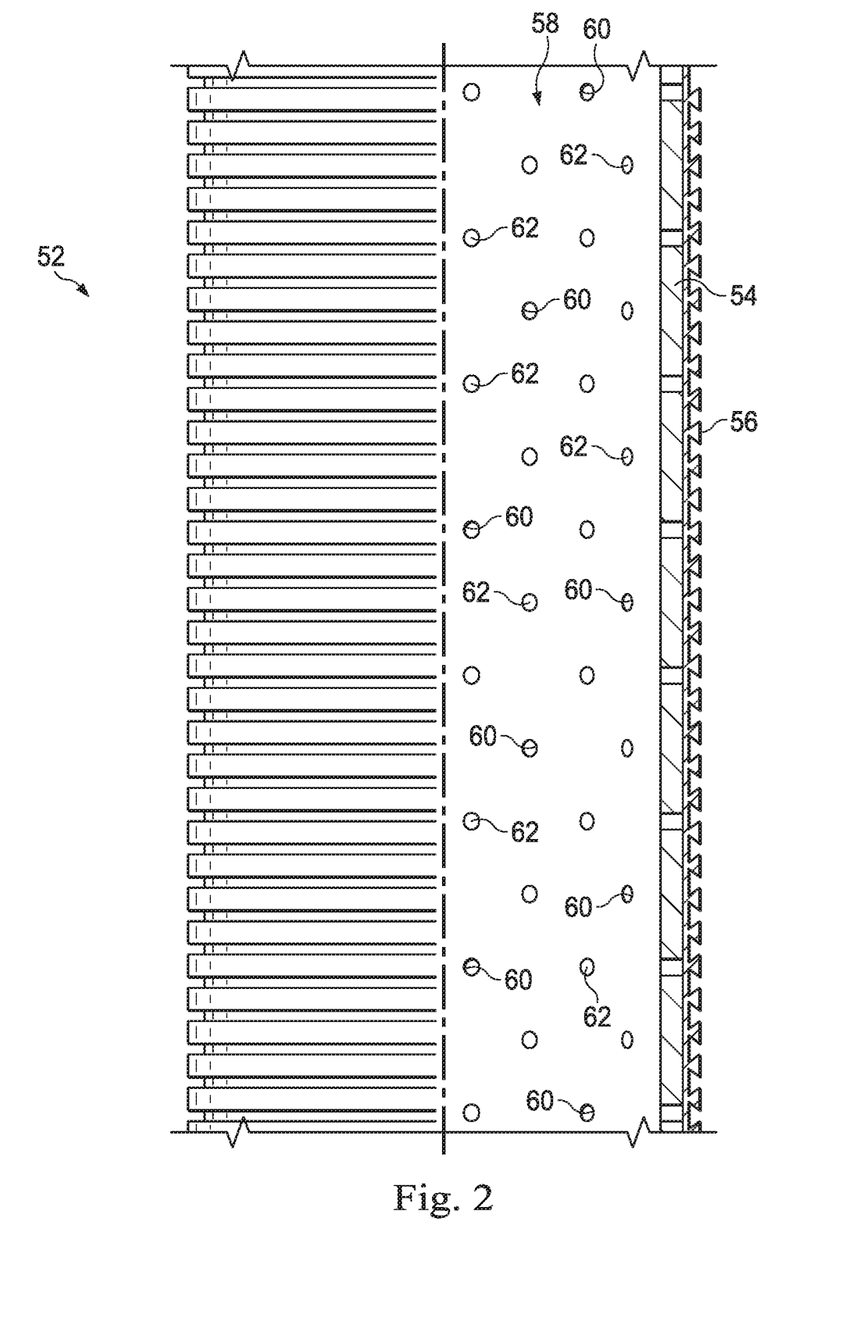
FIG. 2 is an enlarged partial cross-section of the filter assembly of FIG. 1, the filter assembly including a base pipe having a plurality of openings formed therein, a screen, and a plurality of plugs, according to an exemplary embodiment.

Referring now to FIG. 2, with continuing reference to FIG. 1, an exemplary embodiment of a portion of the filter assembly 52 is illustrated, including a base pipe 54 and a screen 56 concentrically disposed about the base pipe 54. The screen 56 may be attached to the base pipe 54 using a variety of connection techniques such as, for example, using a shrink fit connector, a friction fit connector, a threaded connection, a nut and bolt, a weld, another mechanical connection, or any combination thereof. The base pipe 54 defines an internal flow passage 58 and has a plurality of openings 60 formed therethrough, beneath the screen 56. The openings 60 allow fluid to pass radially through the base pipe 54. The screen 56 is an elongated tubular member disposed on the base pipe 54 so as to define an annular flow passage between the screen 56 and the base pipe 54. The annular flow passage is commonly called a drainage layer and directs fluid through the openings 60 in the base pipe 54 so that the fluid may flow between the annulus 46 and the internal flow passage 58.

In several exemplary embodiments, the screen 56 is a filter formed of wire or synthetic mesh disposed along the outer surface of the base pipe 54. The wire or synthetic mesh is wound or wrapped onto the base pipe 54 to form the screen 56. In other embodiments, the screen 56 is made from a filter medium such as wire wraps, mesh, sintered material, pre-packed granular material, and other materials known in the industry. The filter medium can be selected for the particular well environment to effectively filter out solids from the reservoir. Moreover, in several exemplary embodiments, the annular flow passage between the screen 56 and the base pipe 54 is formed using standoff supports (not shown) arranged in parallel, and circumferentially spaced around the exterior surface of the base pipe 54 to support the screen 56 in a radially spaced-apart arrangement from the base pipe 54. The annular flow passage may also be formed using corrugated metal, perforated tubes, or bent shapes to support the screen 56.

In an exemplary embodiment, with continuing reference to FIG. 2, a plurality of plugs 62 are disposed within the respective openings in the base pipe 54. The plugs form a fluid and pressure tight seal with the base pipe 54 to prevent, or at least reduce, fluid flow through the openings 60. Moreover, the plugs 62 are capable of blocking, or at least obstructing, radial flow through the openings 60 in the base pipe 54 during installation of the lower completion string into the wellbore 38. Alternatively, the plugs 62 may be adapted to partially prevent radial flow through the openings 60 in the base pipe 54 (e.g., through the use of an orifice, a nozzle, or the like) and/or to permit radial flow through the openings 60 in only a single direction. In any event, the plugs 62 reduce the risk of damaging or clogging the filter assembly, especially the screen 56, during installation into the wellbore 38.

Once the lower completion string 42 is installed in the wellbore 38, the plugs 62 are adapted to be at least partially degraded at an appropriate time, and in a suitable manner, for the specific operation performed in the wellbore 38, whether it be fracturing of the formation 14, gravel packing around the screen 56, injecting fluids into the formation 14, producing hydrocarbons from the formation 14, another wellbore operation, or some combination thereof. Degradation of the plugs 62 may be achieved using a variety of techniques, including, but not limited to dissolution in acid, salt water, and/or another fluid in the wellbore (whether introduced from the surface or present in the wellbore 38), galvanic corrosion, erosion by a nozzle or some other device, another mechanical or chemical process, or any combination thereof. The structure and operation of the plugs 62 will be described in further detail below. Although exemplary embodiments of the plugs 62 are described hereinbelow as part of the filter assembly, the plugs 62 are equally well suited for use with other downhole well tools, assemblies, or systems. In several exemplary embodiments, the plugs 62 are identical to one another and, therefore, only one of the plugs 62 will be described in detail below.

Figure 3:
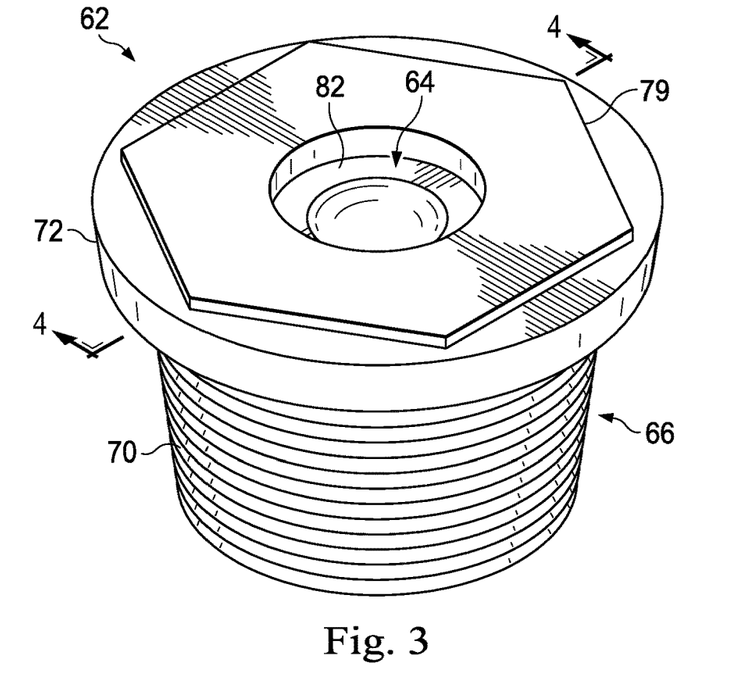
FIG. 3 is a perspective view of one of the plugs of FIG. 2, according to an exemplary embodiment.
Figure 4:
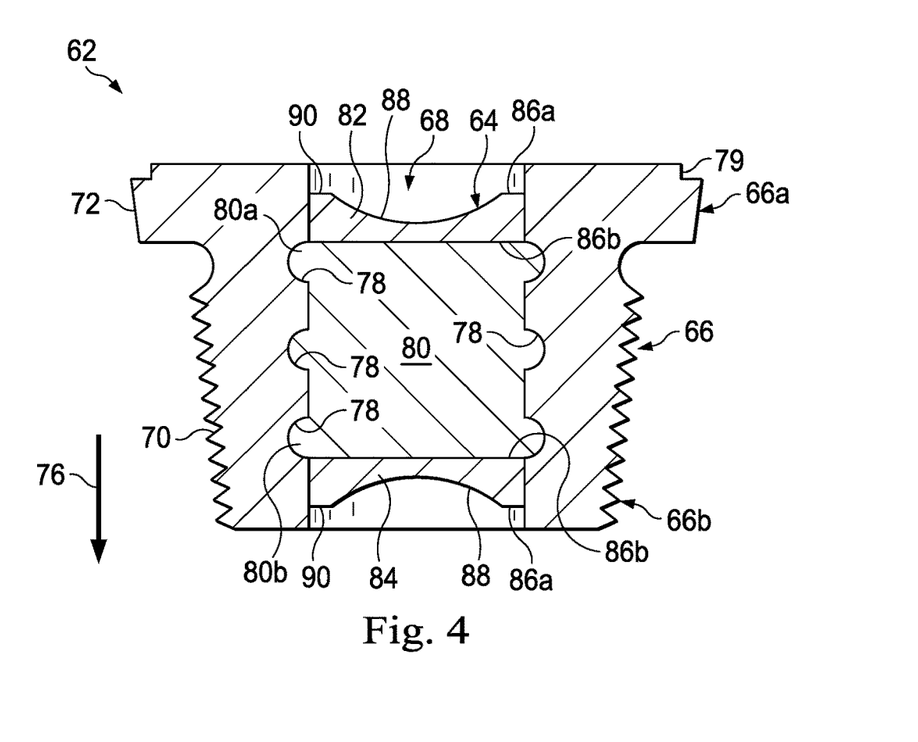
FIG. 4 is a cross-sectional view of the plug, taken along the line 4-4 of FIG. 3, according to an exemplary embodiment.
Figure 5:
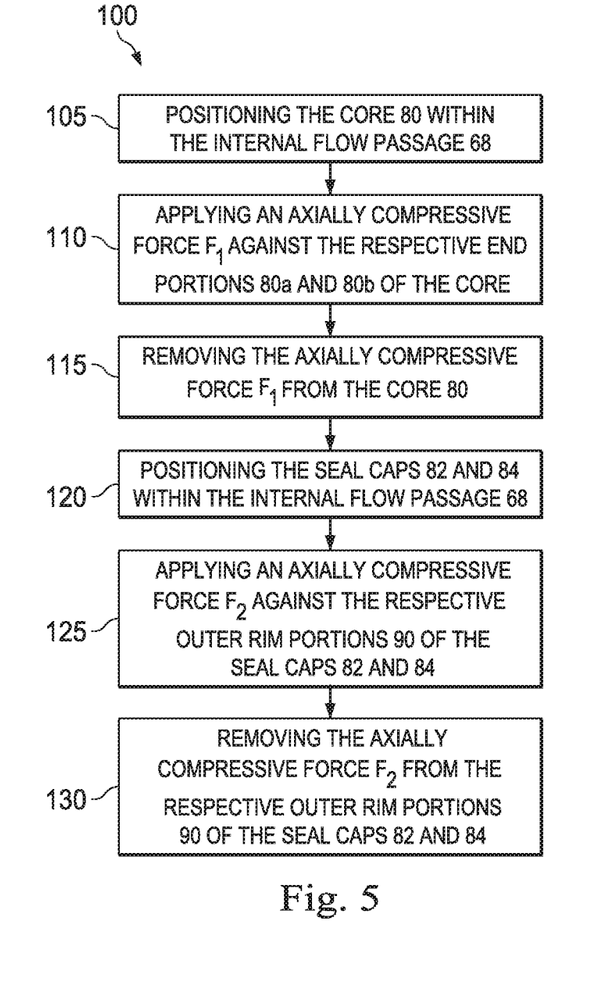
FIG. 5 is a flowchart illustrating a method of assembling the plug of FIGS. 2-4, according to an exemplary embodiment.

Referring to FIGS. 3 and 4, with continuing reference to FIGS. 1 and 2, an exemplary embodiment of the plug 62 is illustrated, including a seal 64 and a housing 66 defining an internal flow passage 68 within which the seal 64 extends to prevent, or at least obstruct, fluid flow through the housing 66. In several exemplary embodiments, the housing 66 is made of a material adapted to be non-reactive with the fluid that is present in the wellbore 38. As a result, the housing 66 remains structurally intact when exposed to the fluid in the wellbore 38 or, alternatively, the internal flow passage 58. In several exemplary embodiments, the seal 64 is made of a material adapted to degrade under certain conditions, thus eliminating the necessity for manual intervention in the wellbore 38 to remove the seal 64 (e.g., using a retrieval tool). The term "degrade" is used herein to describe any chemical or physical process by which a component of the seal 64 breaks down into particles small enough so as not to impede fluid flow through the internal flow passage 68 of the housing 66.

The housing 66 is a generally tubular member defining opposing end portions 66a and 66b. An external threaded connection 70 is formed in the exterior of the housing 66 at the end portion 66b thereof. The external threaded connection 70 may be straight or tapered, so as to engage a corresponding internal threaded connection (not shown) formed in the base pipe 54 at a respective one of the openings 60. Further, a flange 72 is formed in the exterior of the housing 66 at the end portion 66a thereof, proximate the external threaded connection 70. The flange 72 defines an external annular shoulder 74 of the housing 66. The external annular shoulder 74 faces in an axial direction 76 and is adapted to abut, or nearly abut, the exterior of the base pipe 54 when the external threaded connection 70 is engaged with the corresponding internal threaded connection (not shown) formed at a respective one of the openings 60. In several exemplary embodiments, an elastomeric sealing component such as, for example, an O-ring, is disposed in an annular groove axially between the external threaded connection 70 and the flange 72. Finally, one or more internal annular grooves 78 are formed in the interior of the housing 66. The internal annular grooves 78 adjoin the internal flow passage 68. In several exemplary embodiments, the internal annular grooves 78 are omitted so that the interior of the housing 66 is uniform and uninterrupted.

In several exemplary embodiments, a connector head 79 is formed in the housing 66 at the flange 72, opposite the external annular shoulder 74. The connector head 79 forms a raised relief in the flange 72 that is adapted to be engaged by a tool (not shown) to tighten the housing 66 into a respective one of the openings 60 in the base pipe 54, thereby providing a fluid and pressure tight seal between the housing 66 and the base pipe 54. Accordingly, the connector head 79 may define a variety of shapes such as, for example, a hexagonal shape, a pentagonal shape, a rectangular shape, a triangular shape, or some other suitable shape.

The seal 64 extends within the internal flow passage 68 of the housing 66 and includes a core 80 and a pair of seal caps 82 and 84. The core 80 is a generally cylindrical member defining opposing end portions 80a and 80b against which an axially compressive force has been applied, as will be discussed in further detail below. As a result of the application of the axially compressive force against the end portions 80a and 80b, at least respective exterior portions of the core 80 extend within the internal annular grooves 78 of the housing 66. The exterior portions of the core 80 that extend within the internal annular grooves 78 are adapted to hold the core 80 within the internal flow passage 68 under extreme pressure and temperature conditions. In those embodiments where the internal annular grooves 78 are omitted from the housing 66, the exterior of the core 80 is urged into frictional engagement with the interior of the housing 66, such frictional engagement being adapted to hold the core 80 within the internal flow passage 68. In some embodiments, the core 80 is made of a material adapted to galvanically react with a fluid that is present in the wellbore 38 or, alternatively, the internal flow passage 58. In other embodiments, the core 80 is made of a material adapted to dissolve in a fluid that is present in the wellbore 38 or, alternatively, the internal flow passage 58. In any event, the core 80 is made of a degradable material such as, for example, a metal or a metal alloy that is reactive under defined conditions.

In several exemplary embodiments, the core 80 is made of a metal or a metal alloy that is susceptible to degradation by fluid in the wellbore 38 or, alternatively, the internal flow passage 58, such as, for example, a metal or a metal alloy having a high composition of aluminum, magnesium, zinc, silver, and/or copper. In an exemplary embodiment, the core 80 is made of a magnesium alloy that is alloyed with a dopant. In another exemplary embodiment, the core 80 is made of an aluminum alloy that is alloyed with a dopant. Representative dopants include, but are not limited to, nickel, copper, aluminum, calcium, iron, tin, chromium, silver, gold, gallium, indium, palladium, zinc, zirconium, carbon, and/or other dopant materials. In yet another exemplary embodiment, the metal from which the core 80 is constructed is a nanomatrix composite. In certain exemplary embodiments, the metal from which the core 80 is constructed is a solid solution.

In several exemplary embodiments, the metal from which the core 80 is constructed is an extruded product. In several exemplary embodiments, the composition of the core 80 is selected so that the core 80 begins to degrade within a predetermined time after initial exposure to a fluid in the wellbore 38 or, alternatively, the internal flow passage 58. In several exemplary embodiments, the composition of the core 80 is selected so that the rate at which the core 80 degrades is accelerated by adjusting the pressure, temperature, salinity, pH levels, or other characteristics of the fluid in the wellbore 38 or, alternatively, the internal flow passage 58.

In several exemplary embodiments, the core 80 includes at least one electrode of a galvanic cell. For example, at least a portion of the core 80 may form a sacrificial anode of the galvanic cell. Moreover, the housing 66 may form a cathode of the galvanic cell. As a result, in the presence of an electrolyte, the core 80 (i.e., the anode) will undergo corrosion and break down into particles small enough so as not to impede fluid flow through the internal flow passage 68 of the housing 66. In several exemplary embodiments, the galvanic reaction between the housing 66 and the core 80 is delayed by preventing contact between the core 80 and the electrolytic fluid, through the use of a substance such as, for example, a coating (not shown). The coating may be dissolvable so that the galvanic reaction between the core 80 and the housing 66 is delayed for a predetermined amount of time. Alternatively, the core 80 may include both the anode and the cathode of the galvanic cell.

The seal caps 82 and 84 are located within the internal flow passage 68 of the housing 66, adjacent the respective opposing end portions 80a and 80b of the core 80. In several exemplary embodiments, the seal caps 82 and 84 are identical to one another. Thus, each of the seal caps 82 and 84 defines opposing end faces 86a and 86b. A central depression 88 is formed in the respective end faces 86a of the seal caps 82 and 84. The central depressions 88 define relatively thin portions of the respective seal caps 82 and 84, thus facilitating subsequent damage or removal of the seal caps 82 and 84 via abrasion or other techniques, as will be discussed in further detail below. The seal caps 82 and 84 each include an outer rim portion 90 against which an axially compressive force has been applied, as will be discussed in further detail below. The outer rim portions 90 circumscribe the respective central depressions 88 of the seal caps 82 and 84 and maintain the edge stress between the interior of the housing 66 and the respective seal caps 82 and 84. As a result of the application of the axially compressive force against the respective outer rim portions 90 of the seal caps 82 and 84, the end faces 86b of the seal caps 82 and 84 abut, or nearly abut, the respective end portions 80a and 80b of the core 80. Moreover, respective outer rim portions 90 of the seal caps 82 and 84 are urged into frictional engagement with the interior of the housing 66, such frictional engagement being adapted to hold the seal caps 82 and 84 within the internal flow passage 68. In this manner, the core 80 is completely enclosed by the housing 66 and the seal caps 82 and 84.

In several exemplary embodiments, one or both of the seal caps 82 and 84 are made of a material that is non-reactive with the fluid in the wellbore 38 or, alternatively, the internal flow passage 58, such as, for example, a metal or a metal alloy having a high composition of copper, nickel, silver, chrome, gold, tin, lead, bismuth, platinum, or iron. Alternatively, in other exemplary embodiments, one or both of the seal caps 82 and 84 are made of a material adapted to degrade at a significantly slower rate than the material from which the core 80 is constructed. As a result, the degradation of the core 80 is delayed until one or both of the seal caps 82 and 84 have been sufficiently degraded. In several exemplary embodiments, one or both of the seal caps 82 and 84 are made of a material that becomes corrosion resistant in response to the exertion of an axially compressive force on the seal caps 82 and 84, as will be described in further detail below. In several exemplary embodiments, one or both of the seal caps 82 and 84 are made of a material that erodes when exposed to a particular type of fluid such as, for example, a particle laden fluid.

In several exemplary embodiments, one or both of the seal caps 82 and 84 are made of a material that softens or melts when exposed to a threshold temperature. In several exemplary embodiments, the threshold temperature is greater than a temperature that occurs proximate the plug 62 under normal operating conditions. For example, the temperature in the wellbore 38 or, alternatively, the internal flow passage 58, may be manipulated to exceed the threshold temperature and cause one or both of the seal caps 82 and 84 to soften or melt.

In several exemplary embodiments, one or both of the seal caps 82 and 84 are made of a material that fractures when exposed to a threshold pressure. In several exemplary embodiments, the threshold pressure is greater than a pressure that occurs proximate the plug 62 under normal operating conditions. For example, the pressure in the wellbore 38 or, alternatively, the internal flow passage 58, may be manipulated to exceed the threshold pressure and cause one or both of the seal caps 82 and 84 to fracture.

In operation, the external threaded connections 70 of the plugs 62 are threadably engaged with the respective internal threaded connections (not shown) formed at the openings 60 of the base pipe 54. The filter assembly 52 is then made up as part of the completion section 44 and lowered into the wellbore 38. In several exemplary embodiments, during the lowering of the completion section 44 into the wellbore 38, the seals 64 remain un-degraded within the respective housings 66 of the plugs 62. Once the completion section 44 is properly positioned in the wellbore 38, a fluid is communicated to the completion section 44 to perform, for example, injection or well treatment operations. In addition to, or instead of, the injection or well treatment operations, the completion section 44 may be utilized to produce hydrocarbons and/or other natural resources from the formation 14. In any event, once the completion section 44 has been properly positioned in the wellbore 38, the respective cores 80 of the plugs 62 are at least partially degraded at an appropriate time, and in a suitable manner, for the specific operation performed in the wellbore 38. To prevent the cores 80 from prematurely degrading, the respective seal caps 82 and 84 form protective layers between the cores 80 and the fluid in the wellbore 38 or, alternatively, the internal flow passage 58. At a predetermined time, the seal caps 82 and 84 are ruptured or removed from the housings 66 by, for example, ablation, abrasion, erosion, perforation, heating, ripping, corrosion, or the like. The resultant damage or removal of the seal caps 82 and 84 exposes the cores 80 to fluids within the wellbore 38 or, alternatively, the internal flow passage 58, which causes the cores 80 to degrade into particles small enough to permit fluid flow through the openings 60. The fluid to which the core 80 is exposed when the seal caps 82 and 84 are removed may include, but is not limited to, a corrosive fluid, an acidic fluid, an electrolytic fluid, other fluids capable of degrading the core 80, or any combination thereof. The fluid triggers a chemical reaction that continues until the core 80 breaks down into particles small enough so as not to impede the radial flow of fluid through the base pipe 54 via the internal flow passages 68 of the plugs 62.

Referring to FIGS. 5 and 6A-6D, with continuing reference to FIGS. 1-4, an exemplary method for assembling the plug 62 is generally designated by the reference numeral 100, including the step of positioning the core 80 within the internal flow passage 68 at step 105; applying an axially compressive force $F_1$ against the respective end portions 80a and 80b of the core 80 at step 110; removing the axially compressive force $F_1$ from the core 80 at the step 115; positioning the seal caps 82 and 84 within the internal flow passage 68 at step 120; applying an axially compressive force $F_2$ against the respective outer rim portions 90 of the seal caps 82 and 84 at step 125; and removing the axially compressive force $F_2$ from the respective outer rim portions 90 of the seal caps 82 and 84 at step 130.

Figure 6A:
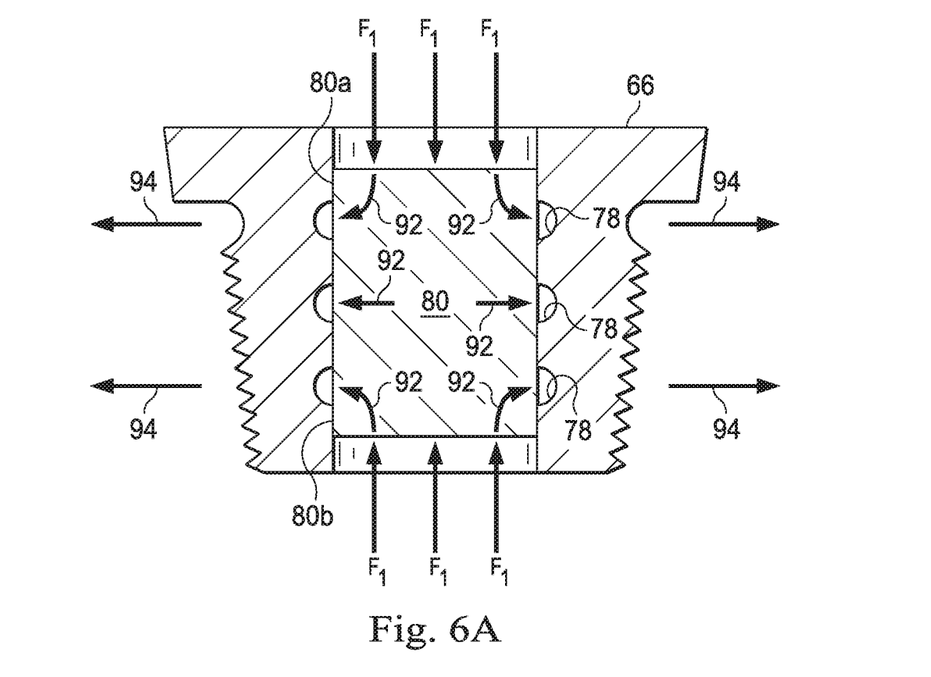
FIG. 6A is a cross-sectional view of the plug of FIGS. 2-4 illustrating a step of the method of FIG. 5, according to an exemplary embodiment.

At the step 105, in several exemplary embodiments, the core 80 is positioned within the internal flow passage 68 adjacent the internal annular grooves 78, as shown in FIG. 6A.

Figure 6B:
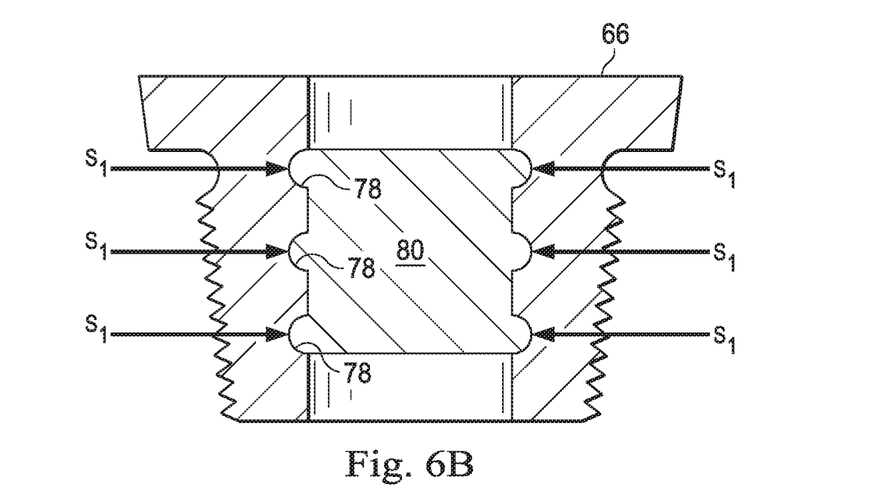
FIG. 6B is a cross-sectional view of the plug of FIGS. 2-4 illustrating another step of the method of FIG. 5, according to an exemplary embodiment.

At the step 110, in several exemplary embodiments, an axially compressive force $F_1$ is applied against the respective end portions 80a and 80b of the core 80. The axially compressive force $F_1$ urges the core 80 radially into the internal annular grooves 78 of the housing 66, as indicated by arrows 92 (FIG. 6A). Moreover, the axially compressive force $F_1$ elastically deforms the housing 66, as indicated by arrows 94 (FIG. 6A). Continued application of the axially compressive force $F_1$ causes respective portions of the exterior of the core 80 to expand or flow radially into the respective annular grooves 78 of the housing 66, as shown in FIG. 6B. In several exemplary embodiments, this process is referred to as "slow forging" the core 80. The exterior portions of the core 80 that extend within the internal annular grooves 78 are adapted to hold the core 80 within the internal flow passage 68 under extreme pressure and temperature conditions. In those embodiments where the internal annular grooves 78 are omitted from the housing 66, the exterior of the core 80 is urged into frictional engagement with the interior of the housing 66, such frictional engagement being adapted to hold the core 80 within the internal flow passage 68.

At the step 115, in several exemplary embodiments, the axially compressive force $F_1$ is removed from the core 80. The housing 66 is thus permitted to recoil to its original shape, placing a radially inward stress $S_1$ on the core 80, as shown in FIG. 6B. In combination, the radially inward stress $S_1$ exerted on the core 80 by the housing 66 and the extension of the exterior portions of the core 80 within the internal annular grooves 78 are capable of holding the core 80 within the internal flow passage 68 under extreme pressure and temperature conditions. In those embodiments where the internal annular grooves 78 are omitted from the housing 66, the combination of the radially inward stress $S_1$ exerted on the core 80 by the housing 66 and the frictional engagement of the core 80 with the interior of the housing 66 holds the core 80 within the internal flow passage 68.

Figure 6C:
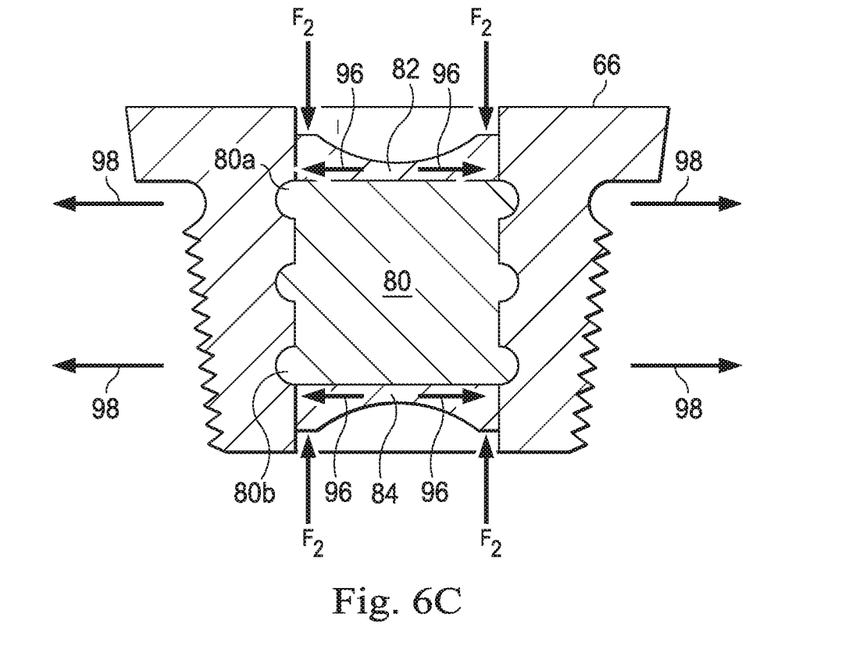
FIG. 6C is a cross-sectional view of the plug of FIGS. 2-4 illustrating yet another step of the method of FIG. 5, according to an exemplary embodiment.

At the step 120, in several exemplary embodiments, the seal caps 82 and 84 are positioned within the internal flow passage 68 adjacent the respective end portions 80a and 80b of the core 80, as shown in FIG. 6C.

At the step 125, in several exemplary embodiments, an axially compressive force $F_2$ is applied against the respective outer rim portions 90 of the seal caps 82 and 84. The axially compressive force $F_2$ urges the respective outer rim portions 90 of the seal caps 82 and 84 radially into contact with the interior of the housing 66, as indicated by arrows 96 (FIG. 6C). Moreover, the axially compressive force $F_2$ also deforms the housing 66, as indicated by arrows 98. In several exemplary embodiments, continued application of the axially compressive force $F_2$ causes the material of the seal caps 82 and 84 to fuse to the core 80. Moreover, the axially compressive force $F_2$ causes the outer rim portions 90 of the seal caps 82 and 84 to expand radially.

Figure 6D:
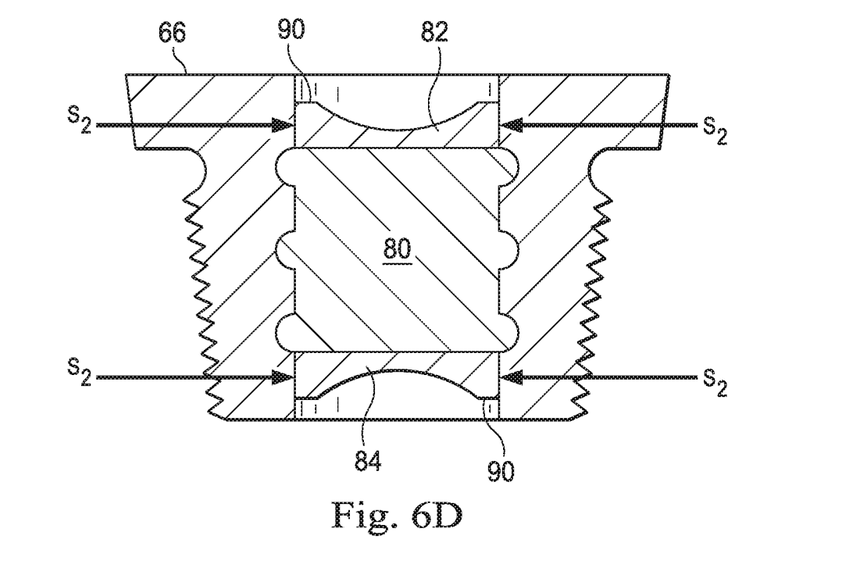
FIG. 6D is a cross-sectional view of the plug of FIGS. 2-4 illustrating a final step of the method of FIG. 5, according to an exemplary embodiment.

At the step 130, in several exemplary embodiments, the axially compressive force $F_2$ is removed from the respective outer rim portions 90 of the seal caps 82 and 84. The housing 66 is thus permitted to recoil to its original shape, placing a radially inward stress $S_2$ on the seal caps 82 and 84, as shown in FIG. 6D. In combination, the radial expansion of the seal caps 82 and 84 and the radially inward stress $S_2$ exerted on the seal caps 82 and 84 by the housing 66 are adapted to hold the seal caps 82 and 84 within the internal flow passage 68. More particularly, the respective outer rim portions 90 of the seal caps 82 and 84 are urged into frictional engagement with the interior of the housing 66, such frictional engagement being adapted to hold the seal caps 82 and 84 within the internal flow passage 68 until they are damaged or removed during operation.

Although the method 100 for assembling the plug 62 has been described herein to include separate steps for installing the core 80 and the seal caps 82 and 84, these elements may instead be installed contemporaneously in the housing 66 by applying a single axially compressive force to both the core 80 and the seal caps 82 and 84. Moreover, although the plug 62 has been described herein as including the seal caps 82 and 84, the seal caps 82 and 84 may be omitted from the plug 62. Similarly, although the method 100 for assembling the plug 62 has been described herein as including steps for installing the seal caps 82 and 84, the steps for installing the seal caps 82 and 84 may be omitted from the method 100.

The present disclosure introduces a degradable plug for a downhole tubular, the downhole tubular defining a flow path, the degradable plug including a housing adapted to be connected to the downhole tubular and to extend within the flow path thereof, the housing defining an internal flow passage; a core extending within the internal flow passage and engaging the interior of the housing to impede fluid flow through the internal flow passage, the core being adapted to degrade when exposed to a downhole fluid; and one or more seal caps extending within the internal flow passage adjacent the core, the one or more seal caps being adapted to prevent exposure of the core to the downhole fluid. In an exemplary embodiment, the core is adapted to be exposed to the downhole fluid by damaging or removing at least a portion of the one or more seal caps; and, when the core is exposed to the downhole fluid, the core is adapted to degrade so that the core no longer impedes flow through the internal flow passage and fluid communication is permitted through the flow path of the downhole tubular. In an exemplary embodiment, the one or more seal caps include: a central depression defining a relatively thin portion of the seal cap; and an outer rim portion circumscribing the central depression and maintaining edge stress between the seal cap and the interior of the housing; and the core is adapted to be exposed to the downhole fluid by damaging or removing the relatively thin portion of the one or more seal caps. In an exemplary embodiment, the relatively thin portion of the one or more seal caps is adapted to be damaged or removed by at least one of: ablation, erosion, perforation, abrasion, heating, ripping, and/or corrosion. In an exemplary embodiment, the housing includes one or more internal annular grooves adjoining the internal flow passage; and the core includes one or more exterior portions extending within the one or more internal annular grooves to hold the core within the internal flow passage. In an exemplary embodiment, the housing includes an external threaded connection formed in the exterior of the housing and engaging a corresponding interior threaded connection formed in the downhole tubular; and a connector head adapted to be engaged by a tool to tighten the housing into the interior threaded connection of the downhole tubular, thus providing a pressure tight seal between the housing and the downhole tubular. In an exemplary embodiment, the core includes a metal that is susceptible to degradation by the downhole fluid, the metal having a high composition of at least one of: aluminum, magnesium, zinc, silver, and copper. In an exemplary embodiment, the core includes a metal alloyed with a dopant so as to be susceptible to degradation by the downhole fluid, the dopant including at least one of: nickel, copper, aluminum, calcium, iron, tin, chromium, silver, gold, gallium, palladium, indium, zinc, zirconium, and carbon. In an exemplary embodiment, the degradable plug further includes a cathode of a galvanic cell, the core forms a sacrificial anode of the galvanic cell, and the downhole fluid is an electrolytic fluid; and, in the presence of the electrolytic fluid, the core is adapted to corrode so that the core no longer impedes flow through the internal flow passage and fluid communication is permitted through the flow path of the downhole tubular.

The present disclosure also introduces a method of assembling a degradable plug for a downhole tubular, the downhole tubular defining a flow path, the method including providing a housing defining an internal flow passage; positioning a core within the internal flow passage; applying a first axially compressive force against the core so that the core engages the interior of the housing and causes the housing to elastically deform in a radially outward direction; and removing the first axially compressive force from the core so that the housing recoils in a radially inward direction, which is opposite the radially outward direction, thus imparting a first stress on the core; wherein, when the first stress is imparted on the core, the core impedes fluid flow through the internal flow passage of the housing. In an exemplary embodiment, the method further includes positioning one or more seal caps within the internal flow passage of the housing adjacent the core; applying a second axially compressive force against the one or more seal caps so that the one or more seal caps are urged radially into contact with the interior of the housing and the housing elastically deforms in the radially outward direction; and removing the second axially compressive force from the one or more seal caps so that the housing recoils in the radially inward direction, thus placing a second stress on the one or more seal caps, the one or more seal caps preventing exposure of the core to the downhole fluid. In an exemplary embodiment, the first and second axially compressive forces are combined to form a third axially compressive force that is applied and removed contemporaneously to both the core and the one or more seal caps. In an exemplary embodiment, the core is adapted to be exposed to the downhole fluid by damaging or removing at least a portion of the one or more seal caps; and, when the core is exposed to the downhole fluid, the core is adapted to degrade so that the core no longer impedes flow through the internal flow passage and fluid communication is permitted through the flow path of the downhole tubular. In an exemplary embodiment, the one or more seal caps include: a central depression defining a relatively thin portion of the seal cap; and an outer rim portion circumscribing the central depression and maintaining edge stress between the seal cap and the interior of the housing; and the core is adapted to be exposed to the downhole fluid by damaging or removing the relatively thin portion of the one or more seal caps. In an exemplary embodiment, the relatively thin portion of the one or more seal caps are adapted to be damaged or removed by at least one of: ablation, erosion, perforation, abrasion, heating, ripping, and/or corrosion. In an exemplary embodiment, the core includes a metal that is susceptible to degradation by the downhole fluid, the metal having a high composition of at least one of: aluminum, magnesium, zinc, silver, and copper. In an exemplary embodiment, the core includes a metal alloyed with a dopant so as to be susceptible to degradation by the downhole fluid, the dopant including at least one of: nickel, copper, aluminum, calcium, iron, tin, chromium, silver, gold, gallium, palladium, indium, zinc, zirconium, and carbon. In an exemplary embodiment, the housing includes one or more internal annular grooves adjoining the internal flow passage; and applying the first axially compressive force against the core causes one or more exterior portions of the core to expand or flow into the one or more internal annular grooves, thus holding the core within the internal flow passage. In an exemplary embodiment, the housing includes an external threaded connection formed in the exterior of the housing and engaging a corresponding interior threaded connection formed in the downhole tubular; and a connector head adapted to be engaged by a tool to tighten the housing into the interior threaded connection of the downhole tubular, thus providing a pressure tight seal between the housing and the downhole tubular. In an exemplary embodiment, the degradable plug further includes a cathode of a galvanic cell, the core forms a sacrificial anode of the galvanic cell, and the downhole fluid is an electrolytic fluid; and, in the presence of the electrolytic fluid, the core is adapted to corrode so that the core no longer impedes flow through the internal flow passage and fluid communication is permitted through the flow path of the downhole tubular.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A degradable plug for a downhole tubular, the downhole tubular defining a flow path, the degradable plug comprising:
    a housing adapted to be connected to the downhole tubular and to extend within the flow path thereof, the housing defining an internal flow passage;
    a core extending within the internal flow passage and engaging the interior of the housing to impede fluid flow through the internal flow passage, the core being adapted to degrade when exposed to a downhole fluid; and
    one or more seal caps extending within the internal flow passage adjacent the core, the one or more seal caps being adapted to prevent exposure of the core to the downhole fluid;
    wherein the housing exerts a first radially inward stress on the core and a second radially inward stress on the one or more seal caps, each of the first and second radially inward stresses being caused by radially inward recoil of the housing.

2. The degradable plug of claim 1,
    wherein the core is adapted to be exposed to the downhole fluid by damaging or removing at least a portion of the one or more seal caps; and
    wherein, when the core is exposed to the downhole fluid, the core is adapted to degrade so that the core no longer impedes flow through the internal flow passage and fluid communication is permitted through the flow path of the downhole tubular.

3. The degradable plug of claim 2,
    wherein the one or more seal caps comprise: a central depression defining a relatively thin portion of the seal cap; and an outer rim portion circumscribing the central depression and maintaining edge stress between the seal cap and the interior of the housing; and
    wherein the core is adapted to be exposed to the downhole fluid by damaging or removing the relatively thin portion of the one or more seal caps.

4. The degradable plug of claim 3, wherein the relatively thin portion of the one or more seal caps is adapted to be damaged or removed by at least one of: ablation, erosion, perforation, abrasion, heating, ripping, and/or corrosion.

5. The degradable plug of claim 1,
    wherein the housing comprises one or more internal annular grooves adjoining the internal flow passage; and
    wherein the core comprises one or more exterior portions extending within the one or more internal annular grooves to hold the core within the internal flow passage.

6. The degradable plug of claim 1, wherein the housing comprises:
    an external threaded connection formed in the exterior of the housing and engaging a corresponding interior threaded connection formed in the downhole tubular; and
    a connector head adapted to be engaged by a tool to tighten the housing into the interior threaded connection of the downhole tubular, thus providing a pressure tight seal between the housing and the downhole tubular.

7. The degradable plug of claim 1, wherein the core comprises a metal that is susceptible to degradation by the downhole fluid, the metal having a high composition of at least one of: aluminum, magnesium, zinc, silver, and copper.

8. The degradable plug of claim 1, wherein the core comprises a metal alloyed with a dopant so as to be susceptible to degradation by the downhole fluid, the dopant comprising at least one of: nickel, copper, aluminum, calcium, iron, tin, chromium, silver, gold, gallium, palladium, indium, zinc, zirconium, and carbon.

9. The degradable plug of claim 1,
    wherein the degradable plug further comprises a cathode of a galvanic cell, the core forms a sacrificial anode of the galvanic cell, and the downhole fluid is an electrolytic fluid; and
    wherein, in the presence of the electrolytic fluid, the core is adapted to corrode so that the core no longer impedes flow through the internal flow passage and fluid communication is permitted through the flow path of the downhole tubular.

10. A method of assembling a degradable plug for a downhole tubular, the downhole tubular defining a flow path, the method comprising:
    providing a housing defining an internal flow passage;
    positioning a core within the internal flow passage;
    applying a first axially compressive force against the core so that the core engages the interior of the housing and causes the housing to elastically deform in a radially outward direction; and removing the first axially compressive force from the core so that the housing recoils in a radially inward direction, which is opposite the radially outward direction, thus imparting a first stress on the core;

positioning one or more seal caps within the internal flow passage of the housing adjacent the core;

applying a second axially compressive force against the one or more seal caps so that the one or more seal caps are urged radially into contact with the interior of the housing and the housing elastically deforms in the radially outward direction; and removing the second axially compressive force from the one or more seal caps so that the housing recoils in the radially inward direction, thus placing a second stress on the one or more seal caps, the one or more seal caps preventing exposure of the core to the downhole fluid;

wherein, when the first stress is imparted on the core, the core impedes fluid flow through the internal flow passage of the housing.

11. The method of claim 10, wherein the first and second axially compressive forces are combined to form a third axially compressive force that is applied and removed contemporaneously to both the core and the one or more seal caps.

12. The method of claim 10,
wherein the core is adapted to be exposed to the downhole fluid by damaging or removing at least a portion of the one or more seal caps; and
wherein, when the core is exposed to the downhole fluid, the core is adapted to degrade so that the core no longer impedes flow through the internal flow passage and fluid communication is permitted through the flow path of the downhole tubular.

13. The method of claim 10,
wherein the one or more seal caps comprise: a central depression defining a relatively thin portion of the seal cap; and an outer rim portion circumscribing the central depression and maintaining edge stress between the seal cap and the interior of the housing; and
wherein the core is adapted to be exposed to the downhole fluid by damaging or removing the relatively thin portion of the one or more seal caps.

14. The method of claim 13, wherein the relatively thin portion of the one or more seal caps are adapted to be damaged or removed by at least one of: ablation, erosion, perforation, abrasion, heating, ripping, and/or corrosion.

15. The method of claim 10, wherein the core comprises a metal that is susceptible to degradation by the downhole fluid, the metal having a high composition of at least one of: aluminum, magnesium, zinc, silver, and copper.

16. The method of claim 10, wherein the core comprises a metal alloyed with a dopant so as to be susceptible to degradation by the downhole fluid, the dopant comprising at least one of: nickel, copper, aluminum, calcium, iron, tin, chromium, silver, gold, gallium, palladium, indium, zinc, zirconium, and carbon.

17. The method of claim 10,
wherein the housing comprises one or more internal annular grooves adjoining the internal flow passage; and
wherein applying the first axially compressive force against the core causes one or more exterior portions of the core to expand or flow into the one or more internal annular grooves, thus holding the core within the internal flow passage.

18. The method of claim 10, wherein the housing comprises:
an external threaded connection formed in the exterior of the housing and engaging a corresponding interior threaded connection formed in the downhole tubular; and
a connector head adapted to be engaged by a tool to tighten the housing into the interior threaded connection of the downhole tubular, thus providing a pressure tight seal between the housing and the downhole tubular.

19. The method of claim 10,
wherein the degradable plug further comprises a cathode of a galvanic cell, the core forms a sacrificial anode of the galvanic cell, and the downhole fluid is an electrolytic fluid; and
wherein, in the presence of the electrolytic fluid, the core is adapted to corrode so that the core no longer impedes flow through the internal flow passage and fluid communication is permitted through the flow path of the downhole tubular.

* * * * *